(12) United States Patent
Rayeski et al.

(10) Patent No.: US 11,831,033 B2
(45) Date of Patent: Nov. 28, 2023

(54) HOT-SWAPPABLE BATTERY PACK SYSTEM

(71) Applicant: Otter Products, LLC, Fort Collins, CO (US)

(72) Inventors: Jonathan B. Rayeski, Fort Collins, CO (US); Grady E. Barfoot, Denver, CO (US); Jonathan B. Miksch, Fort Collins, CO (US); Andrew W. Willard, Windsor, CO (US); Jack B. Nanney, Fort Collins, CO (US); Christopher R. Langlois, Loveland, CO (US)

(73) Assignee: Otter Products, LLC, Fort Collins, CO (US)

( * ) Notice: Subject to any disclaimer, the term of this patent is extended or adjusted under 35 U.S.C. 154(b) by 506 days.

(21) Appl. No.: 17/116,006

(22) Filed: Dec. 9, 2020

(65) Prior Publication Data

US 2021/0218001 A1 Jul. 15, 2021

Related U.S. Application Data

(60) Provisional application No. 62/959,056, filed on Jan. 9, 2020.

(51) Int. Cl.
*H01M 50/20* (2021.01)
*A63F 13/24* (2014.01)
(Continued)

(52) U.S. Cl.
CPC ............. *H01M 50/20* (2021.01); *A63F 13/24* (2014.09); *H02J 50/005* (2020.01); *H02J 50/10* (2016.02); *H02J 50/40* (2016.02)

(58) Field of Classification Search
CPC ...... H01M 50/20; H01M 50/204; H02J 50/10; H02J 50/005; H02J 50/40; A63F 13/24
See application file for complete search history.

(56) References Cited

U.S. PATENT DOCUMENTS

| 5,959,433 A | 9/1999 | Rohde |
| 6,153,947 A | 11/2000 | Rockow et al. |
| (Continued) | | |

OTHER PUBLICATIONS

"LBX36 Instruction Manual," Jan. 2015, Black + Decker, pp. 1-2 (Year: 2015).*

*Primary Examiner* — Steve Rowland (57) ABSTRACT

A rechargeable battery pack system includes a retention cage, a reserve power module, and a rechargeable battery pack. The retention cage is removably attachable over a battery compartment of a game controller. The reserve power module has first electrical contacts that contact battery contacts of the game controller for providing electrical power from the reserve power module to the game controller when the reserve power module is in the retention cage and the retention cage is attached to the game controller. The rechargeable battery pack has electrical contacts to contact second electrical contacts of the reserve power module for providing electrical power to the reserve power module and to the game controller, through the reserve power module. The reserve power module can uninterruptedly power the game controller when the depleted rechargeable battery pack is removed from the retention cage to be replaced by a charged rechargeable battery pack.

16 Claims, 12 Drawing Sheets

(51) Int. Cl.
*H02J 50/00* (2016.01)
*H02J 50/10* (2016.01)
*H02J 50/40* (2016.01)

(56) References Cited

U.S. PATENT DOCUMENTS

| | | | |
|---|---|---|---|
| 6,259,171 | B1 | 7/2001 | Cheng |
| 6,294,286 | B1 | 9/2001 | Gosior et al. |
| 6,992,462 | B1* | 1/2006 | Hussaini ............... A63F 13/235 |
| | | | 345/161 |
| 7,375,493 | B2 | 5/2008 | Calhoon et al. |
| 7,948,209 | B2 | 5/2011 | Jung |
| 8,369,904 | B2 | 2/2013 | Bennis et al. |
| 9,048,665 | B2 | 6/2015 | Wojcik et al. |
| 9,450,634 | B2 | 9/2016 | Rayner |
| 9,698,632 | B2 | 7/2017 | Davison et al. |
| 9,851,755 | B2* | 12/2017 | Li ...................... H01M 50/569 |
| 9,948,134 | B2 | 4/2018 | Wojcik |
| 10,630,102 | B2 | 4/2020 | Sa |
| 2004/0082361 | A1* | 4/2004 | Rajagopalan ......... G06F 1/1626 |
| | | | 455/556.1 |
| 2006/0061976 | A1 | 3/2006 | Belson et al. |
| 2007/0103110 | A1 | 5/2007 | Sagoo |
| 2007/0152630 | A1* | 7/2007 | Winkler ................ H02J 7/0013 |
| | | | 320/110 |
| 2009/0072784 | A1 | 3/2009 | Erickson |
| 2011/0023130 | A1 | 1/2011 | Gudgel et al. |
| 2011/0115430 | A1 | 5/2011 | Saunamäki |
| 2011/0140541 | A1 | 6/2011 | Ryu et al. |
| 2011/0205124 | A1 | 8/2011 | Shelef |
| 2012/0217971 | A1 | 8/2012 | DeLuca |
| 2012/0322553 | A1* | 12/2012 | Burgess .................. A63F 13/20 |
| | | | 463/37 |
| 2013/0076148 | A1* | 3/2013 | Sa .......................... H02J 9/061 |
| | | | 307/80 |
| 2013/0088185 | A1 | 4/2013 | Rapoport et al. |
| 2013/0198867 | A1 | 8/2013 | Ricci et al. |
| 2013/0225082 | A1 | 8/2013 | Kang et al. |
| 2013/0278207 | A1 | 10/2013 | Yoo |
| 2013/0335014 | A1 | 12/2013 | Ashinghurst et al. |
| 2016/0378467 | A1* | 12/2016 | Doshi ................ G06F 9/30098 |
| | | | 712/208 |
| 2017/0144061 | A1* | 5/2017 | Clarke .................. G06F 1/3231 |
| 2019/0103641 | A1 | 4/2019 | O'Hora |
| 2020/0059112 | A1 | 2/2020 | Langlois et al. |
| 2022/0278319 | A1* | 9/2022 | Yadav ................... H01M 4/661 |
| 2023/0115141 | A1* | 4/2023 | Halyal .................... H02J 50/12 |
| | | | 455/41.1 |

\* cited by examiner

HOT-SWAPPABLE BATTERY PACK SYSTEM

CROSS REFERENCE TO RELATED APPLICATIONS

The present application claims priority to U.S. Provisional Patent Application No. 62/959,056, filed Jan. 9, 2020, which is incorporated by reference in its entirety.

FIELD

This application relates to battery backs for powering electronic devices.

BACKGROUND

Portable electronic devices are available in many forms including cell phones, smart phones, personal digital assistants (PDAs), tablet computers, laptop computers, phablets (phone/tablets), gaming devices, game controllers, multimedia players, computer peripherals, power tools, electronic tools, and electronic instruments of various types. These devices typically operate using one or more batteries. In many cases, these batteries are rechargeable. These types of devices are often used in mobile, remote, or wireless fashions and battery life can be an issue. Spare and/or rechargeable batteries are often used to address the battery life issues. However, shutting off and/or discontinuing use of the device to swap or change a battery may present issues. Improvements in this area are desired.

While many of the examples herein are discussed with respect to a battery pack for a game controller, it should be understood that the techniques, improvements, apparatuses, systems, and methods provided herein are equally applicable to batteries or power packs for other types of portable electrical and electronic devices, including those listed above. Further, while many of the examples herein discuss battery packs, it should be understood that the techniques, improvements, apparatuses, systems, and methods provided herein are equally applicable to devices with other types of portable energy storage devices such as: fuel cells, lithium titanate cells, capacitive energy storage devices, super capacitors, kinetic energy storage devices, thermal energy storage devices, and/or combinations thereof. The claims are not to be limited to any particular type of energy storage device.

DETAILED DESCRIPTION

Portable electronic devices, such as game controllers, often use one or more batteries. In many cases, these batteries are rechargeable. Since battery life is often an issue for these types of devices, spare and/or rechargeable batteries are often used. However, pausing, shutting off, and/or discontinuing use of the device to swap or change the battery may present issues. For a person playing a game, it would be preferable to be able to switch the battery in a game controller without the game or controller being powered down, paused, reset, or rebooted.

In one example, a rechargeable battery pack system for use with a handheld game controller includes a retention cage or frame, a reserve power module, and a rechargeable battery pack. The retention cage is configured to be removably attachable at or over a battery compartment of the handheld game controller when a battery compartment cover of the handheld game controller is not present. The reserve power module has first electrical contacts and second electrical contacts. The first electrical contacts are configured to contact battery contacts of the handheld game controller for providing electrical power from the reserve power module to the handheld game controller when the reserve power module is removably installed in the retention cage and the retention cage is attached to the handheld game controller. The rechargeable battery pack has electrical contacts that are configured to contact the second electrical contacts of the reserve power module for providing electrical power from the rechargeable battery pack to the reserve power module and to the handheld game controller through the reserve power module when the rechargeable battery pack is removably installed in the retention cage and the reserve power module is removably installed in the retention cage. The reserve power module is configured to continuously or uninterruptedly power the handheld game controller during a period when the rechargeable battery pack is removed from the retention cage to be replaced by another instance of the rechargeable battery pack.

Figure 1:
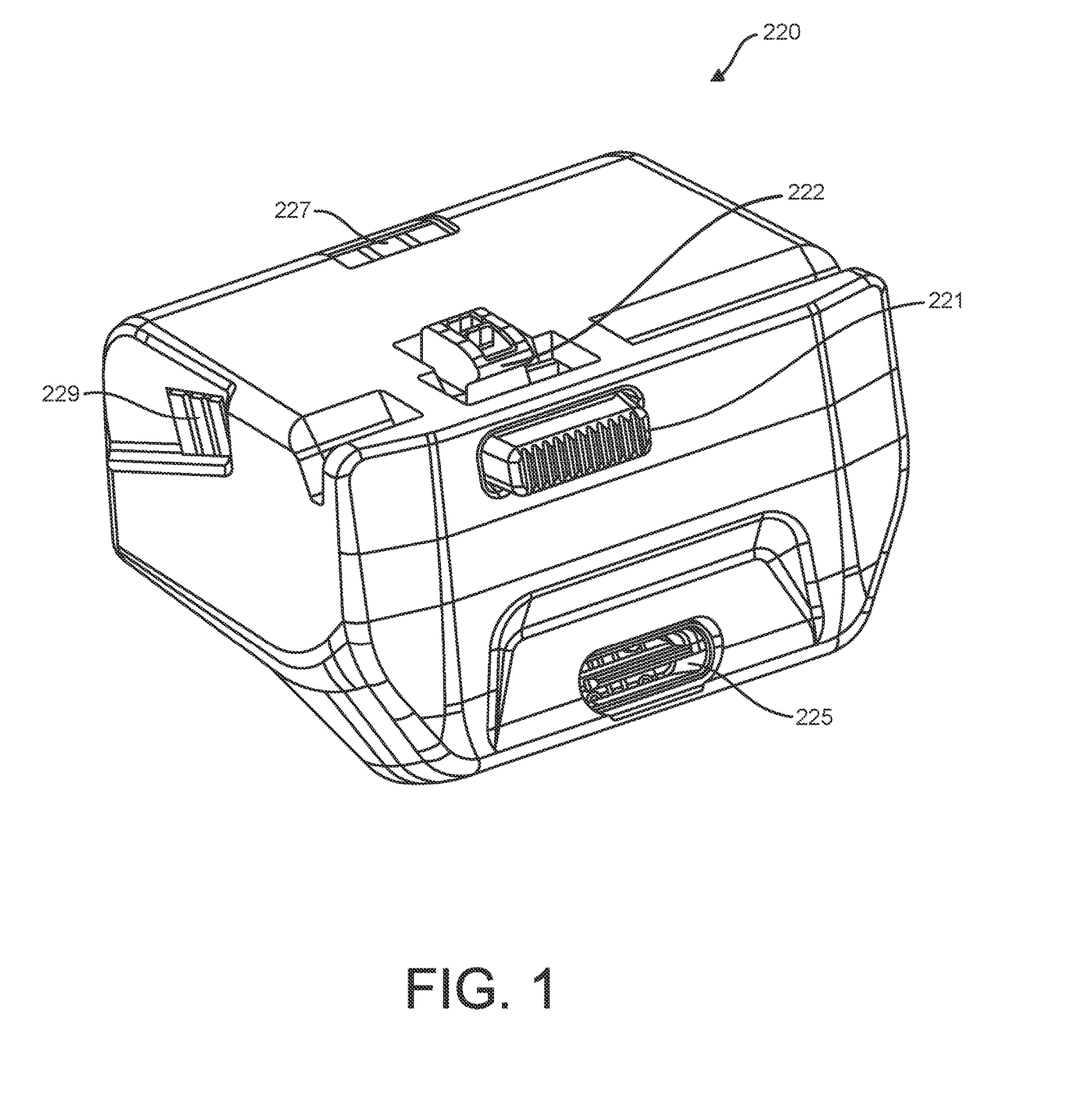
FIG. 1 illustrates a battery pack for use with a game controller.

FIG. 1 illustrates a battery pack 220 for use with a game controller or other battery powered peripheral device. A game controller may also sometimes be called a gaming controller, controller, joystick, or input device. A game controller may be a handheld device used with a gaming system, gaming console, television, or computer system for purposes of wirelessly providing inputs or controlling actions to a software application running on one or more of these devices. Video games, as well as other types of computer applications, are often used for long periods of time and/or may be used continuously as long as a player desires. Players using wireless, battery powered game controllers may play for long enough periods that a battery pack is depleted before the game or session is over. While some games may have the ability to pause while a battery pack is changed, this may not be desirable or possible for a number of reasons. In other cases, pausing is not possible. Therefore, it is desirable to have a hot-swappable battery pack system where a low or depleted game controller battery can be swapped for a new one without turning off, shutting down, interrupting, or rebooting game controller 10. Doing so enables use of the game controller to continue without the interruption of a game, loss of a game, shutdown of the game controller, and/or reset of the game controller.

The battery pack of FIG. 1 includes one or more rechargeable batteries for supplying power to one or more devices to which the battery pack may be attached. Each battery pack may comprise one or more of a variety of electrical power storage technologies including lithium ion (Li-ion), lithium ion polymer (Li-ion polymer), lead-acid, nickel cadmium (NiCd), nickel metal hydride (NiMH), nickel-zinc, alkaline, fuel cells, lithium titanate cells, capacitive energy storage devices, super capacitors, and/or any other type of device for storing energy. While the term "battery" is primarily used herein for purposes of explanation, the apparatuses, methods, systems, and techniques described herein are applicable to any power or energy storage technology. The apparatuses, methods, and techniques described herein are not to be limited to any particular energy storage technology.

Battery pack 220 includes control circuitry for controlling various elements of the battery pack and/or for performing processing functions. The control circuitry may include any type of microcontroller, microprocessor, microcomputer, programmable logic device, reconfigurable circuit, digital signal processor, or application specific circuit that is configured to communicate with other elements of the battery pack and/or to perform power management functions associated with the battery pack. In some circumstances, these power management functions may be described as 'smart' power management functions. The control circuitry may also include other electrical components.

In some configurations, the control circuitry may also communicate with one or more electronic devices which the battery pack is interfaced with. The control circuitry may also communicate with an external power source, communicate with other devices, and/or may communicate with combinations of other devices or systems. The control circuitry may also make use of software, firmware, and/or another type of non-transitory computer executable program instructions stored in the battery pack. Alternately, the software, firmware, and/or computer executable program instructions may be stored in a separate memory device.

Further, battery pack 220 may contain any device or combination of devices for enabling wired and/or wireless communication between the battery pack and one or more other electronic devices. Wireless communications with an electronic device may also be performed using optical or infrared communication methods.

Battery pack 220 may contain one or more sets of electrical contacts or connection points such as electrical contacts 227 and electrical contacts 229. Any of these electrical contacts may be used for conducting electrical power into or out of battery pack 220. In some examples, any of the electrical contacts may also have spring loaded contacts and/or other mechanical features for interfacing with or connecting to another device. Any of these electrical contacts may also be used for communicating data or control signals into or out of battery pack 220. Battery pack 220 may also contain one or more standardized electrical connector or port interfaces, such as USB-C port 225, for transferring power and/or data into and/or out of battery pack 220.

Battery pack 220 may also contain various mechanical engagement features such as a tab, a slot, a clip, a tooth, a snap, a hook, a latch, or similar features for engaging with and removably attaching to other objects as discussed in greater detail below. In one specific example, battery pack 220 includes a spring loaded latch 222 for engaging another item and removably attaching battery pack 220 to the other item. A latch release 221 is used for activating, actuating, or releasing latch 222.

Figure 2A:
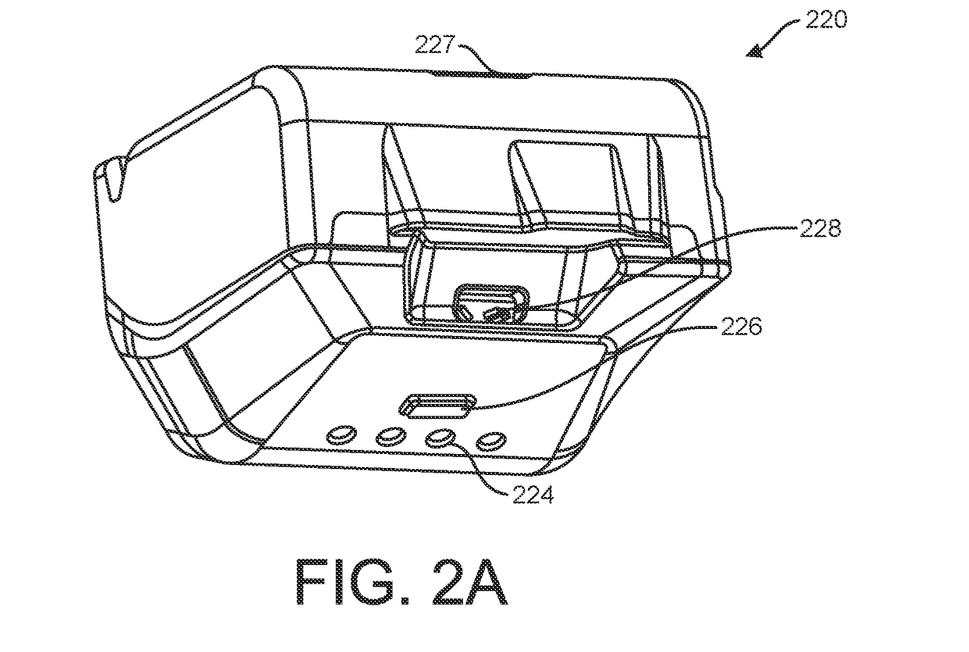
FIG. 2A illustrates a back view of the battery pack of FIG. 1.

FIG. 2A illustrates a back view of battery pack 220. Battery pack 220 includes a set of display elements 224 configured or adapted for displaying a status of battery pack 220. Display elements 224 may be a single display element, a single display elements with multiple segments, or a plurality of display elements. Display elements 224 may display a status, mode, and/or condition of battery pack 220. In one example, display elements 224 may be light emitting diodes (LEDs) which indicate a charge level of one or more batteries of battery pack 220. Battery pack 220 may also include button 226 for activating display elements 224, deactivating display elements 224, and/or switching display elements 224 between modes. Display elements 224 may include one or more of: a light emitting diode (LED), an organic light emitting diode (OLED), a liquid crystal display (LCD), electronic paper, electrophoretic ink, and/or another type of device for visually conveying information to a user, including combinations thereof.

Battery pack 220 also includes one or more low power indicators 228. Low power indicators 228 include LEDs, or other light emitting devices, which activate when one or more batteries of battery pack 220 fall to or below a specified voltage or charge level. In one example, low power indicators 228 are positioned such that they will shine light on the hands or arms of a user who is holding a game controller by the handles (see FIG. 8). Even though battery pack 220 may be on the under side of the game controller and mostly out of view when it is in use, low power indicators 228 will shine on the user's hands or arms to bring the user's attention to the fact that lower power indicators 228 are illuminated. In this way the user is forewarned of the low power condition before battery pack 220 is entirely depleted. The user is notified of the low power condition even though direct line of sight view of battery pack 220 or display elements 224 may not exist.

Figure 2B:
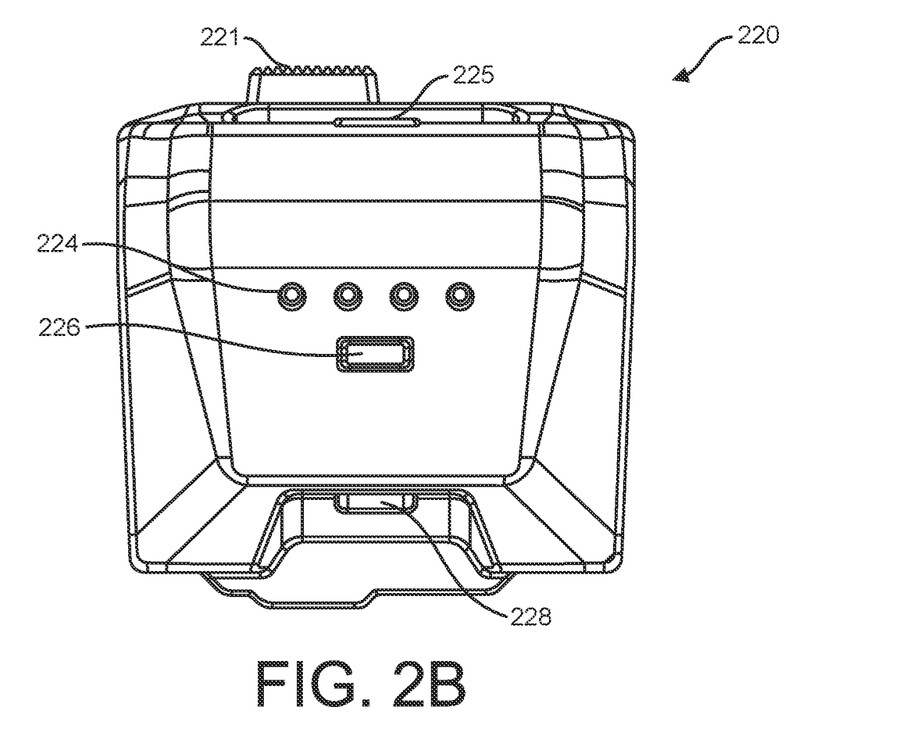
FIG. 2B illustrates a bottom view of the battery pack of FIG. 1.

FIG. 2B illustrates a bottom view of battery pack 220. Battery pack 220 may have other shapes or configurations.

Figure 3A:
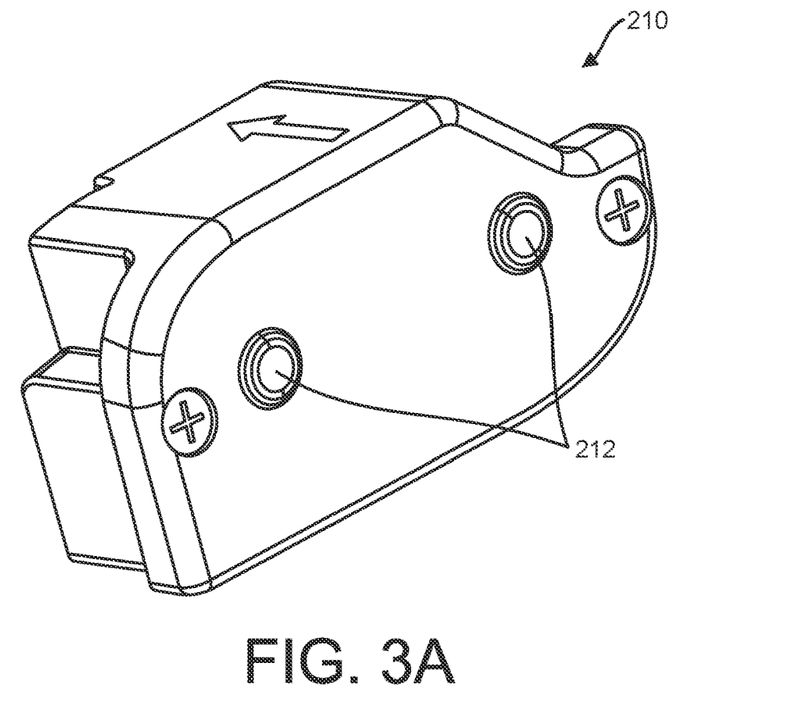
FIG. 3A illustrates a reserve power module.
Figure 3B:
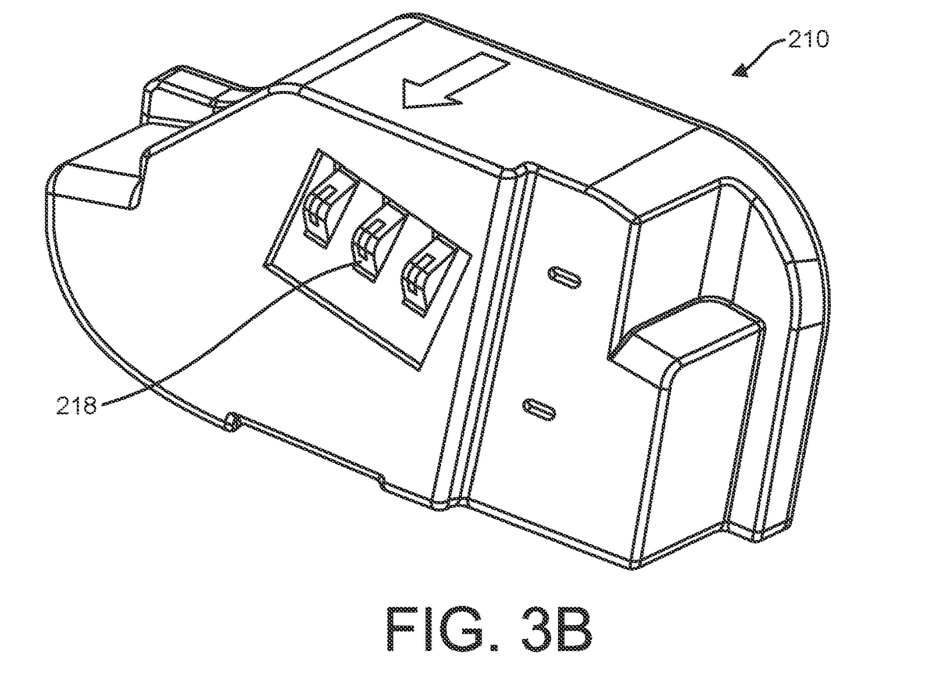
FIG. 3B illustrates an alternate side view of the reserve power module of FIG. 3B.

FIG. 3A illustrates reserve power module 210. Reserve power module 210 is a specialized type of power pack which is designed to power a game controller for relatively short periods of time as compared to a traditional battery pack. Reserve power module 210 may comprise one or more of a variety of electrical power storage technologies including lithium ion (Li-ion), lithium ion polymer (Li-ion polymer), lead-acid, nickel cadmium (NiCd), nickel metal hydride (NiMH), nickel-zinc, alkaline, fuel cells, lithium titanate cells, capacitive energy storage devices, super capacitors, and/or any other type of device for storing energy. Reserve power module 210 is used in conjunction with battery pack 220. Reserve power module 210 includes electrical contacts 212. FIG. 3B illustrates an alternate side view of reserve power module 210 which includes electrical contacts 218.

Figure 4A:
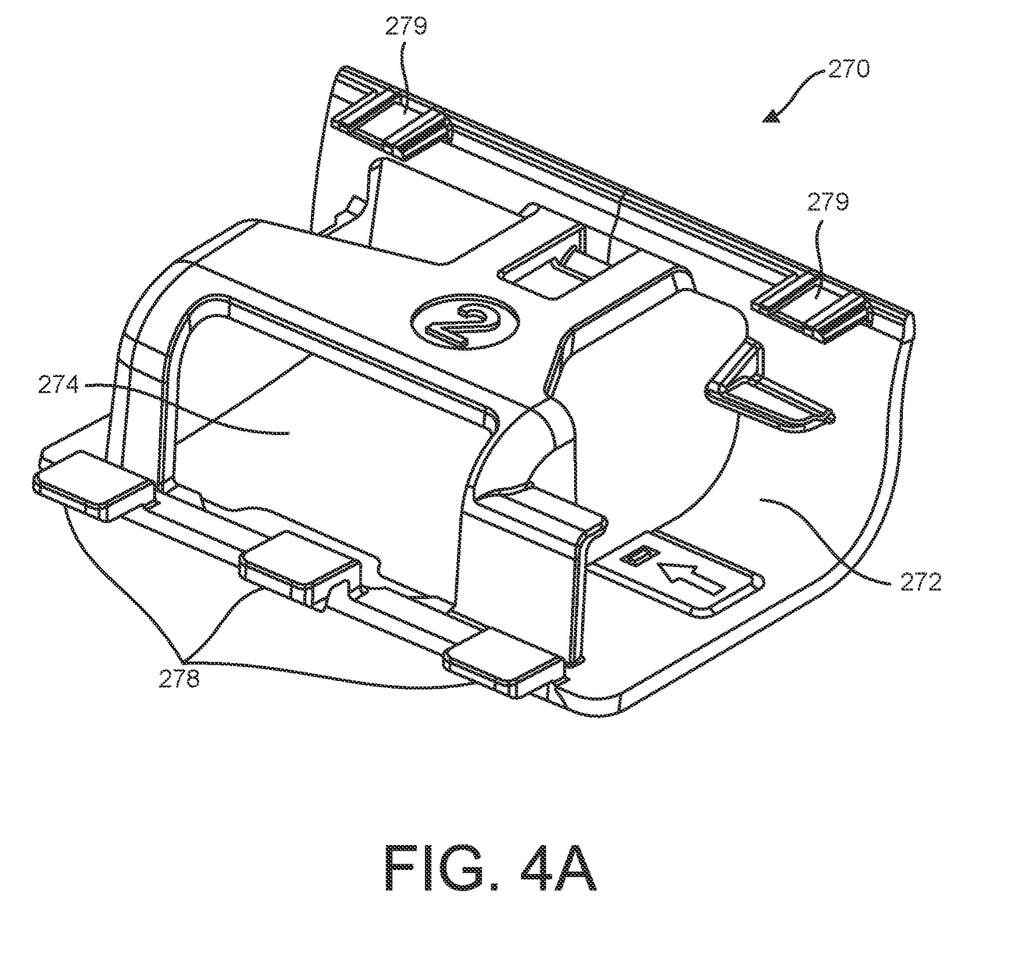
FIG. 4A illustrates a retention cage.
Figure 4B:
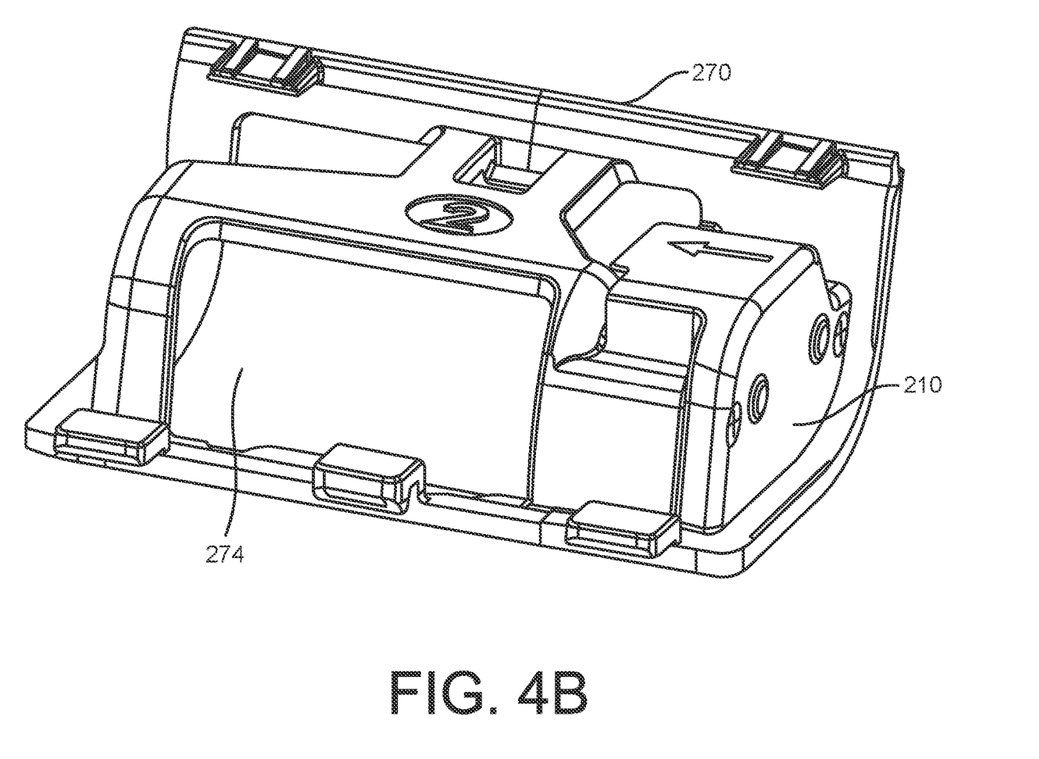
FIG. 4B illustrates the retention cage of FIG. 4A with the reserve power module of FIG. 3A installed.

FIG. 4A illustrates a retention cage 270. In some examples, retention cage 270 may also be referred to as a cage, frame, retention frame, or adapter. Retention cage 270 includes one or more mechanical engagements features such as engagement features 278 and 279 for attaching it to another object, such as a game controller. Retention cage 270 also includes a reserve power module receiving area 272 and a battery pack receiving area 274. FIG. 4B illustrates retention case 270 with reserve power module 210 installed in reserve power module receiving area 272.

Figure 5A:
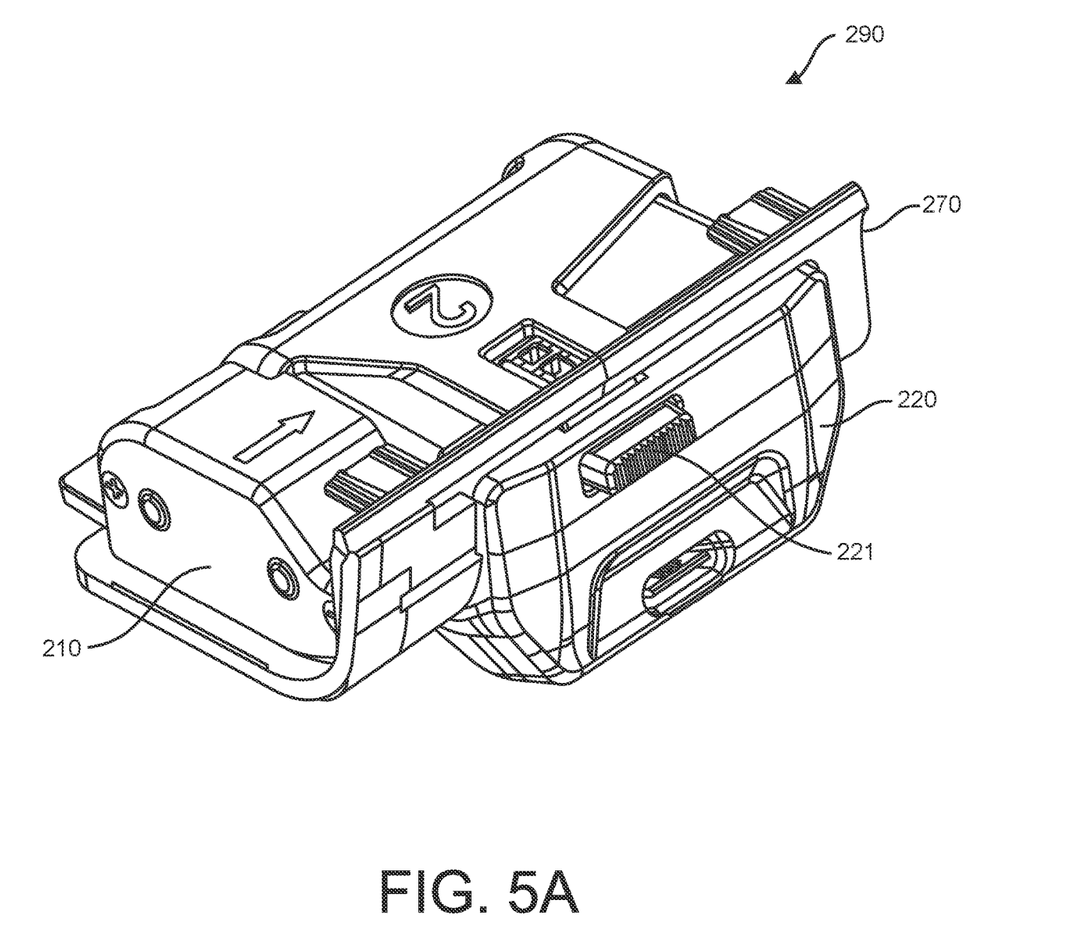
FIG. 5A illustrates a battery pack assembly including the retention cage and reserve power module of FIG. 4B along with the battery pack of FIG. 1 installed.
Figure 5B:
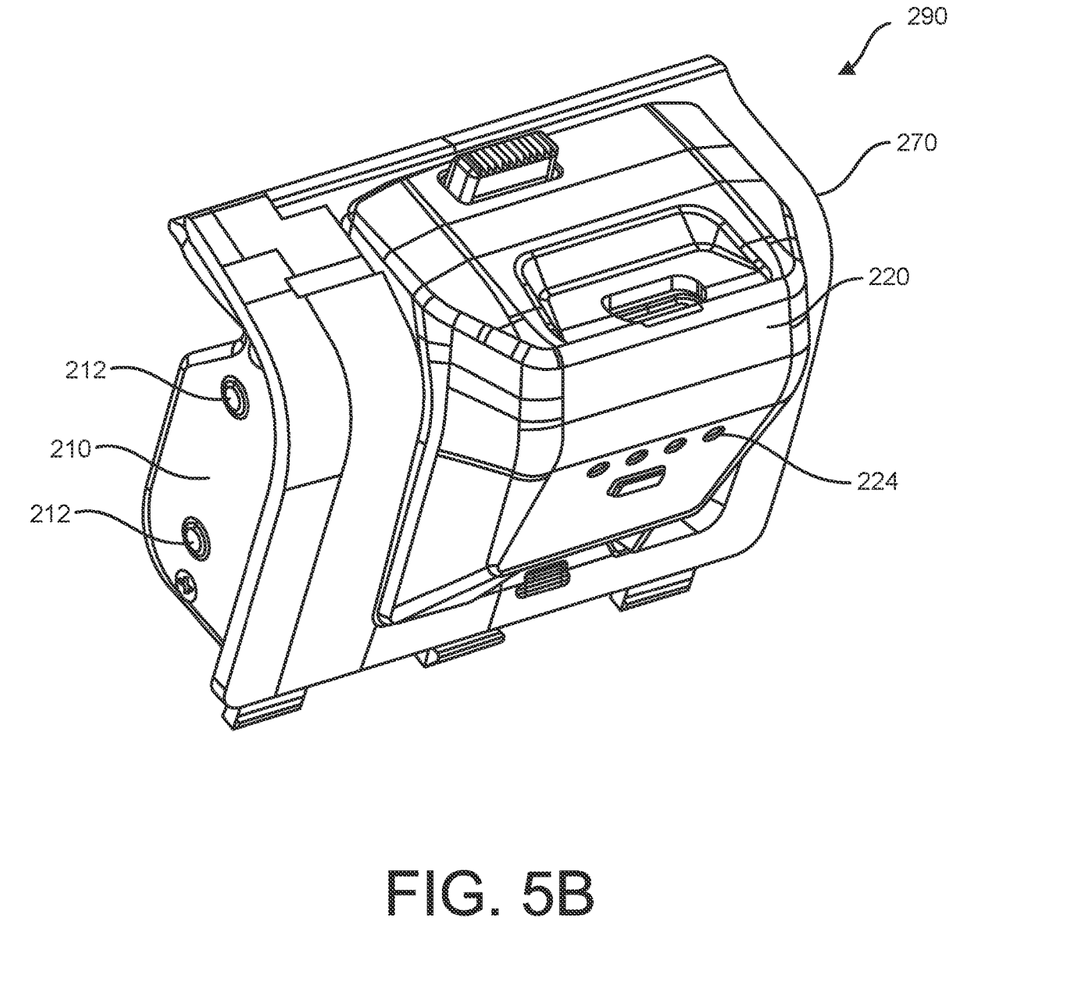
FIG. 5B illustrates an alternate view of the battery pack assembly of FIG. 5A.

FIG. 5A illustrates a battery pack assembly 290 which includes reserve power module 210 and battery pack 220 installed in retention cage 270. When battery pack 220 is installed in retention cage 270, electrical contacts 229 of battery pack 220 contact electrical contacts 218 of reserve power module 210 such that electrical power can flow from battery pack 220 to reserve power module 210. FIG. 5B illustrates an alternate view of battery pack assembly 290 of FIG. 5A.

In some examples, a battery pack system or battery pack kit may include a variation of retention cage 270 or an alternate retention cage which has a different shape, size, and/or mechanical features configured to fit a different game controller or a different device. In other words, a different retention frame or cage may be configured to fit a different controller or device while still being compatible with reserve power module 210 and battery pack 220. In some examples, a battery pack kit or system may include two or more retention cages or frames of different sizes or configurations for use with different controllers or devices.

Figure 6:
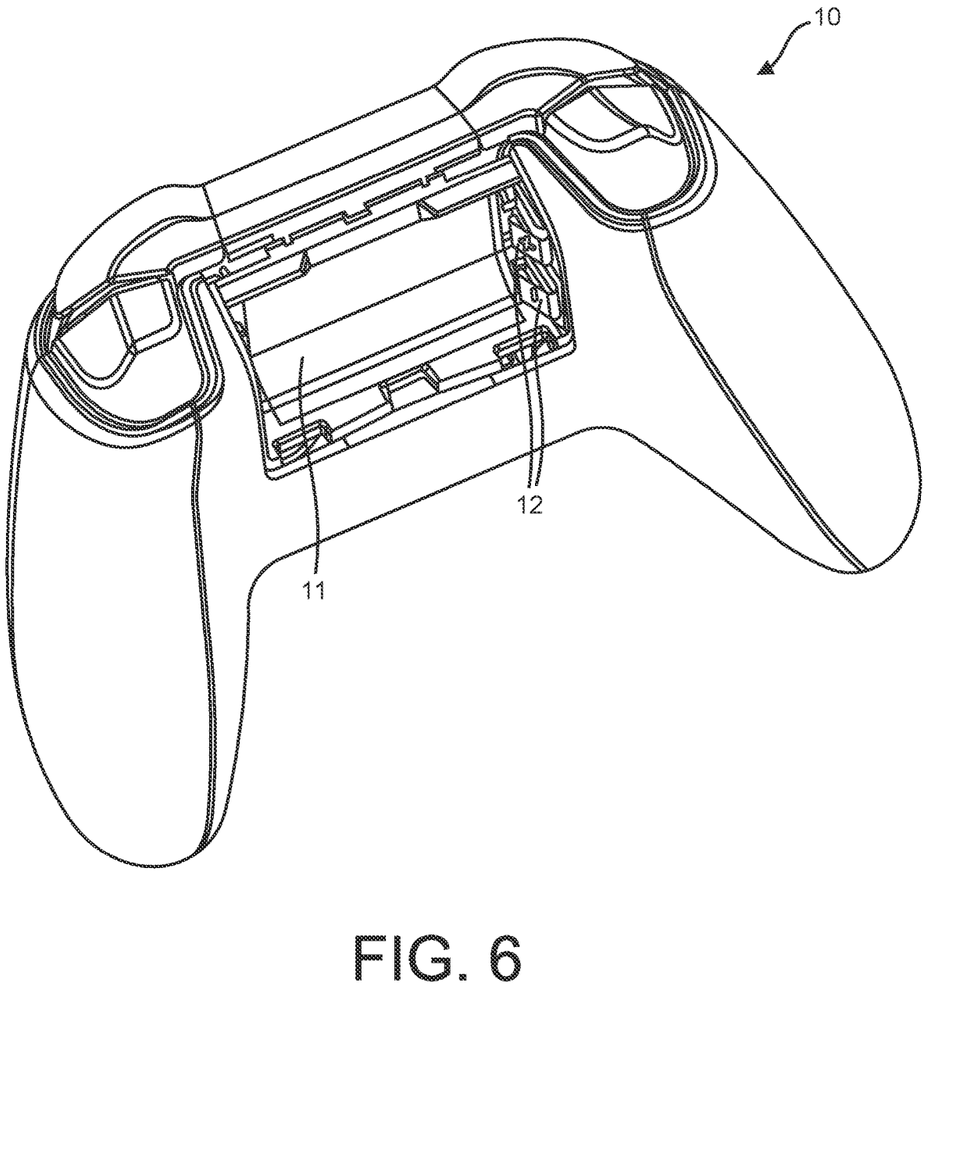
FIG. 6 illustrates a game controller.

FIG. 6 illustrates a bottom side of an exemplary game controller 10. In FIG. 6, a battery compartment 11 of game controller 10 is visible because a battery compartment door or cover (not pictured) has been removed. Battery compartment 11 includes battery contacts 12 for making contact with conventional batteries, such as cylindrical AA or AAA battery cells. Other controllers and controller configurations are possible.

Figure 7:
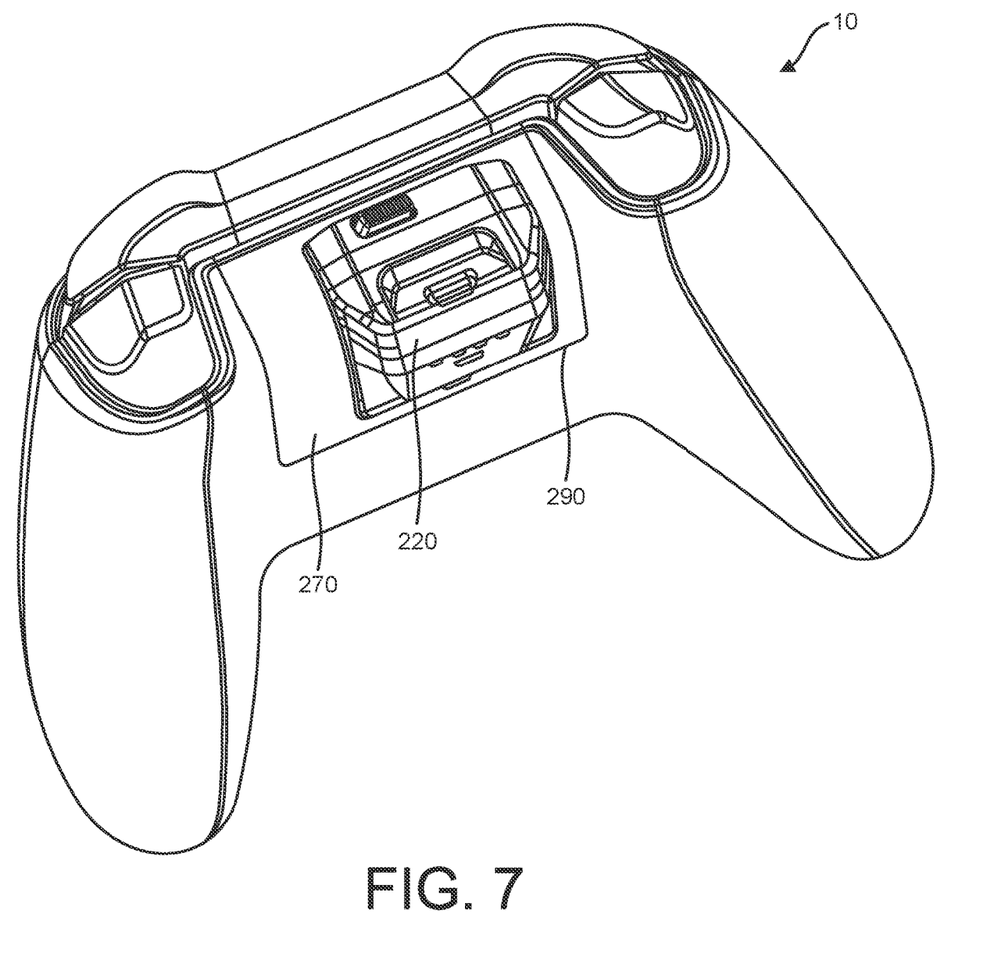
FIG. 7 illustrates the game controller of FIG. 6 with the battery pack assembly of FIG. 5A installed.

FIG. 7 illustrates game controller 10 with the battery pack assembly 290 of FIG. 5A installed. As illustrated, retention cage 270 of battery pack assembly 290 engages and is removably attachable at, to, or over the opening of battery compartment 11 of game controller 10. When battery pack assembly 290 is attached, electrical contacts 212 of reserve power module 210 contact battery contacts 12 of game controller 10 to make electrical contact where conventional batteries would normally be installed. Once installed, reserve power module 210 provides electrical power directly to game controller 10. Battery pack 220 provides electrical power directly to reserve power module 210 and to game controller 10 indirectly through reserve power module 210. In other configurations, battery pack 220 may provide electrical power directly to the game controller. Battery pack assembly 290 may be capable of providing more power than a set of conventional batteries thereby providing a longer use or playing time than the conventional batteries before a battery change is required.

Figure 8:
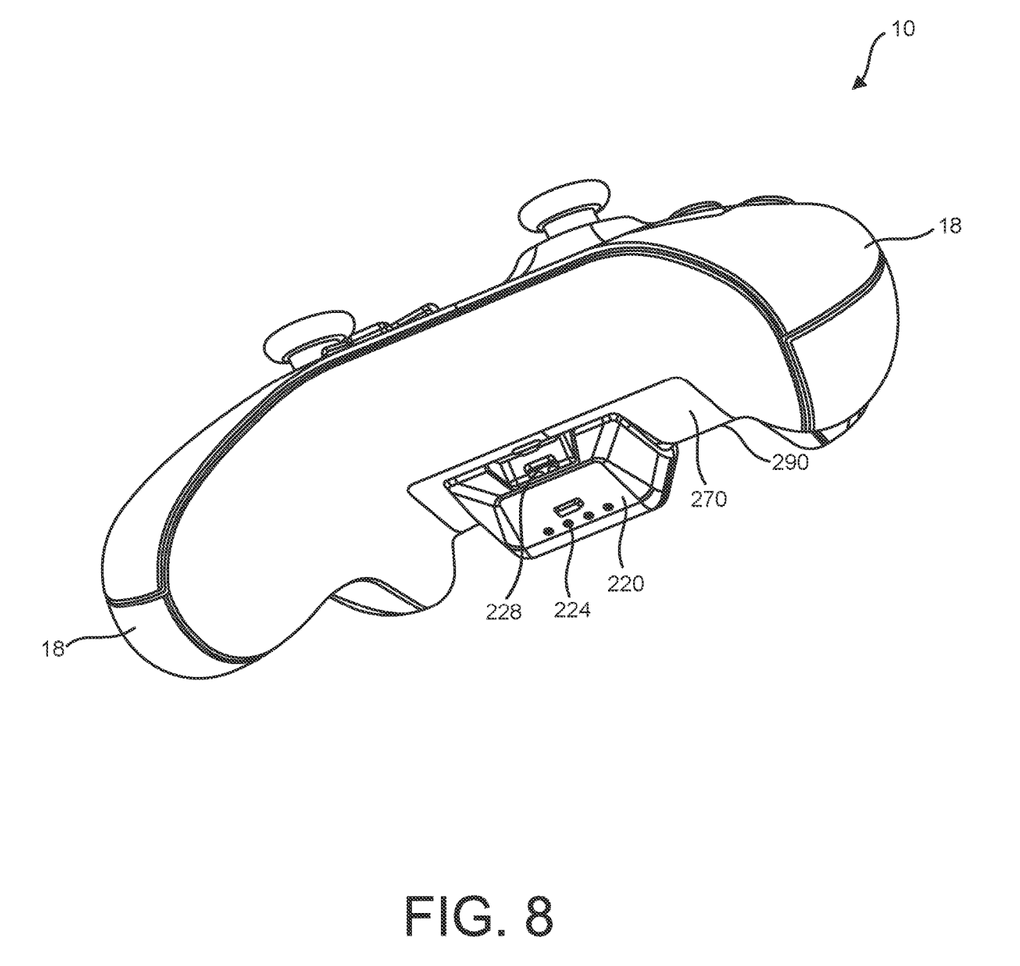
FIG. 8 illustrates an alternate view of the assembly of FIG. 7.

FIG. 8 illustrates an alternate view of the assembly of FIG. 7. When battery pack assembly 290 is installed, low power indicators 228 of battery pack 220 are positioned such that they can direct visible light toward handles 18 of game controller 10. When a user is using game controller 10, battery pack assembly 290 may be facing in a generally downward direction such that it is not visible to the user. However, when low power indicators 228 are activated they will shine light onto or near handles 18 such that the user sees the lower power indication on handles 18 and/or on his or her hand even though battery pack assembly 290 may not be visible. In this way, the user can be easily and effectively notified of a low battery condition while using game controller 10.

Figure 9:
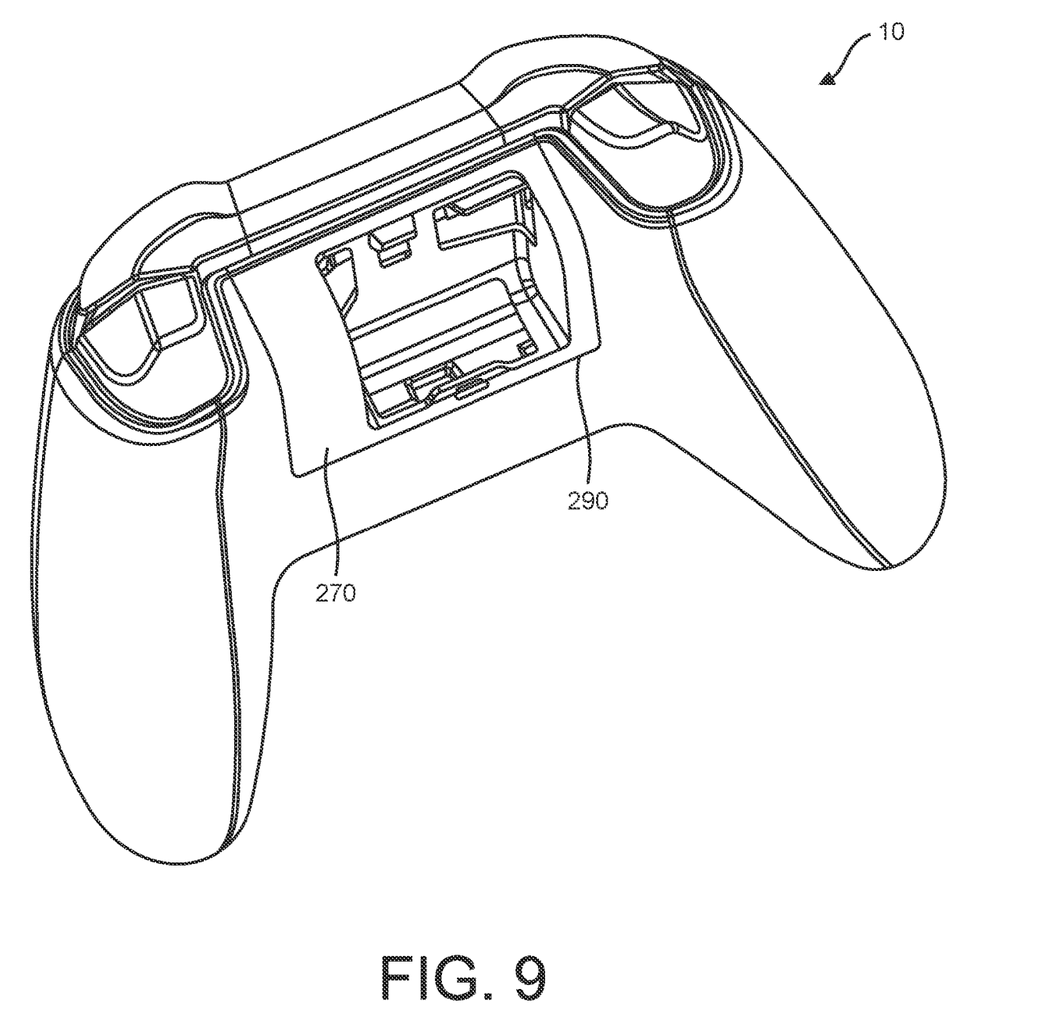
FIG. 9 illustrates the assembly of FIG. 7 with the battery pack of FIG. 1 removed.

FIG. 9 illustrates the assembly of FIG. 7, but with battery pack 220 removed. In other words, battery pack 220 has been released from retention cage 270 using latch release 221. Battery pack 220 may be removed as illustrated when it reaches a low state for purposes of replacing it with another instance of battery pack 220 which is charged. Although not visible in FIG. 9, reserve power module 210 remains installed in the configuration of FIG. 9. Reserve power module 210 keeps game controller 10 powered for a relatively short period of time in an uninterrupted fashion during which battery pack 220 can be replaced with a charged battery pack. In this way, battery pack 220 can be "hot-swapped" without game controller 10 losing power, being shut down, or having to be rebooted or restarted. Consequently, a game or other application game controller 10 is being used with does not have to be ended, discontinued, abandoned, and/or paused.

When a charged battery pack 220 is installed, the new battery pack 220 provides electrical power to reserve power module 210 for purposes of recharging reserve power module 210, as well as for continuing to game controller 10.

Figure 10:
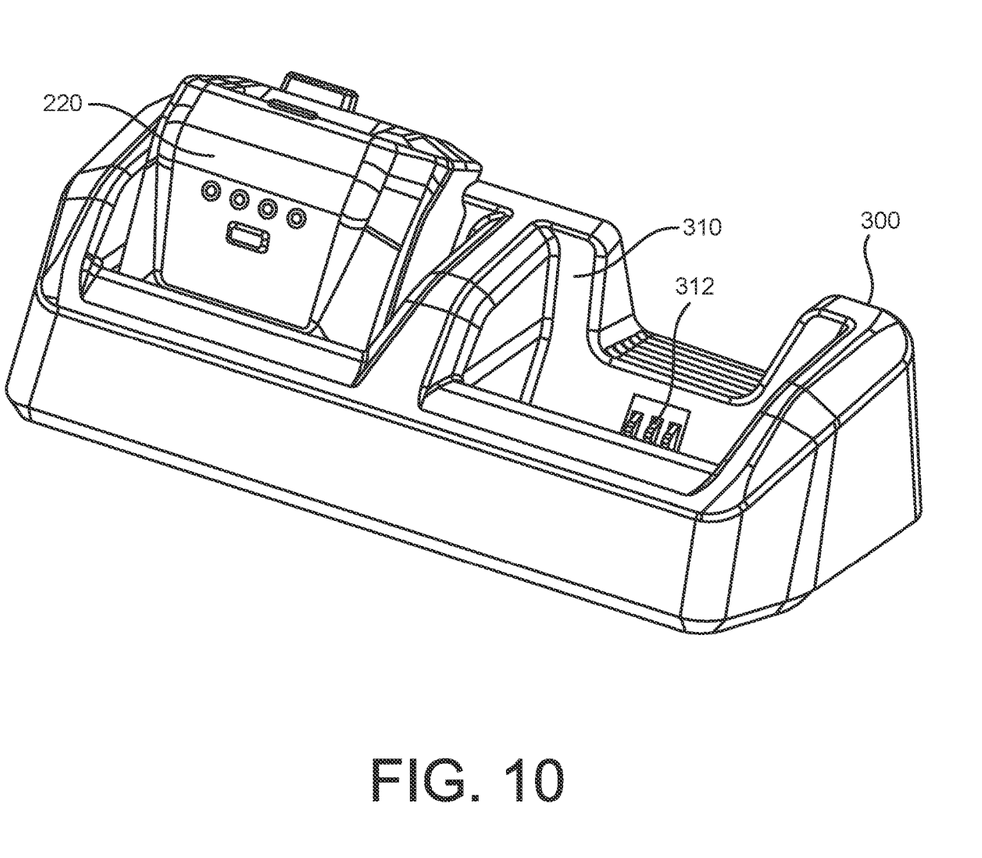
FIG. 10 illustrates a battery charger with the battery pack of FIG. 1 installed.

FIG. 10 illustrates a battery charger 300 for recharging one or more instances of battery pack 220. Battery charger 300 includes one, two, or more charging receptacles 310 each for receiving a battery pack 220. Charging receptacle 310 includes electrical contacts 312 for contacting electrical contacts 227 of battery pack 220 when inserted. Battery charger 300 includes a cable or power cord (not visible in FIG. 10) for providing power to battery charger 300.

While reserve power module 210 may be capable of powering game controller 10 for a specified period of time, several improvements are accomplished when secondary battery pack 220 is also attached. First, the overall use time of game controller 10 is significantly increased because game controller 10 is also able to run off of the power stored in secondary battery pack 220. Secondly, when both reserve power module 210 and secondary battery pack 220 are running low, a hot-swap of battery pack 220 can be performed to replace battery pack 220 with another instance of battery pack 220 which is charged. This is done while reserve power module 210 still has enough power to operate game controller 10 for a short period of time. In this way, the user can switch to a fully charged secondary battery pack 220 without game controller 10 being powered down or turned off. Beneficially, this hot-swapping allows the user to continue the game or other activity without interruption or reset due to game controller 10 being powered down or going offline. The same technique may also be used for devices other than game controllers.

Any of the battery packs, reserve power modules, battery chargers, or controllers disclosed herein may also conduct data communications with each other and/or with other devices. This communication may occur using any known format, protocol, standard, message structure, sequence, or modulation type common to the two devices. The communication may be conducted using any type of known electrical signals, data communication signals, binary signals, and/or analog signals. The communications may serve a variety of purposes. For example, communications may be used to exchange status information, exchange information about charge levels, verify compatibility of devices, and/or identify OEM battery packs for purposes of identifying counterfeit or knockoffs. In some configurations, some electrical contacts may be dedicated to data communication while others are dedicated to power transfer. In other configurations, some of the electrical contacts may be used for both communication and power transfer purposes, either through time division multiplexing or by superimposing or modulating the communication signals while power transfer is taking place. In other examples, data communication may occur using wireless methods.

In one variation, battery pack 220 may also include one or more inductive coils for wireless charging. Electrical charging power can be wirelessly transferred to the battery(s) of battery pack 220 for recharging purposes. This enables battery pack 220 to be recharged without connecting wires or cables. For example, battery pack 220 may be recharged by setting it on a wireless charging pad or base. A number of wireless charging standards have developed for charging portable electrical or electronic devices. These standards include, but are not limited to, Qi and Powermat. The techniques disclosed herein may be used with these or any other wireless charging standard, format, and/or protocol.

Furthermore, an inductive charging coil may also be used to implement or support resonant inductive coupling with any of the battery packs disclosed herein. Resonant inductive coupling involves near field wireless transmission of electrical energy between two magnetically coupled coils that are part of resonant circuits tuned to resonate at similar frequencies. Resonant transfer occurs when a coil ring with an oscillating current generates an oscillating magnetic field. Because the coil is highly resonant, any energy injected into the coil dies away relatively slowly. However, if a second resonant coil is brought near the first coil, the second coil can pick up much of the energy before it is lost. The fields used are predominately non-radiative and sometimes referred to as evanescent waves. Resonant inductive coupling allows the wireless transfer of electrical power over greater distances than basic inductive coupling. Additional electrical components may be used with the inductive coil to form each of the resonant circuits.

Industry standards, such as Rezence, have also been developed for wireless charging of portable electronic devices using resonant inductive coupling techniques like that described above. The improvements disclosed herein may also be used with any standard, format, and/or protocol developed for resonant inductive charging or resonant inductive coupling, or with any other type of wireless charging.

Some or all of the steps and operations associated with the techniques introduced here may be performed by hardware components or may be embodied in non-transitory machine-executable instructions that cause one or more computer processors or microcontrollers programmed with the instructions to perform the steps. Alternatively, the steps may be performed by a combination of hardware, software, and/or firmware.

The apparatuses, systems, methods, techniques, and components described herein are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A rechargeable battery pack system for use with a handheld game controller, the rechargeable battery pack system comprising:
   a retention cage configured to removably attach over a battery compartment of the handheld game controller when a battery compartment cover of the handheld game controller is not present;
   a reserve power module having first electrical contacts and second electrical contacts, wherein the first electrical contacts are configured to contact battery contacts of the handheld game controller for providing electrical power from the reserve power module to the handheld game controller when the reserve power module is removably installed in the retention cage and the retention cage is attached to the handheld game controller; and
   a rechargeable battery pack having first electrical contacts and second electrical contacts, wherein the first electrical contacts are configured to contact the second electrical contacts of the reserve power module for providing electrical power from the rechargeable battery pack to the reserve power module, and to the handheld game controller through the reserve power module, when the rechargeable battery pack and the reserve power module are removably installed in the retention cage, and wherein the rechargeable battery pack may be charged or discharged through each of the first and the second electrical contacts;
   wherein the reserve power module is configured to continue powering the handheld game controller during a period when the rechargeable battery pack is removed from the retention cage for replacement by another instance of the rechargeable battery pack.

2. The rechargeable battery pack system of claim 1 wherein the rechargeable battery pack includes one or more display elements for indicating a status of the rechargeable battery pack and a button for activating the display elements.

3. The rechargeable battery pack system of claim 1 wherein the rechargeable battery pack includes one or more low power indicators configured to direct visible light toward handles of the handheld game controller when the installed rechargeable battery pack reaches a low power level and the retention cage is attached to the handheld game controller.

4. The rechargeable battery pack system of claim 1 wherein the reserve power module stores electrical power using one or more capacitors or super capacitors.

5. The rechargeable battery pack system of claim 1 further comprising a second rechargeable battery pack.

6. The rechargeable battery pack system of claim 5 further comprising a battery charger for recharging one or more of the rechargeable battery pack and the second rechargeable battery pack.

7. A battery pack system for use with a battery powered game controller, the battery pack system comprising:
   a retention cage adapted to be removably attachable at a battery compartment of the game controller;
   a rechargeable battery pack having electrical contacts, wherein the rechargeable battery pack is removably attachable to the retention cage, wherein the rechargeable battery pack includes one or more light sources adapted to direct visible light toward handles of the game controller onto one or more hands of a user holding the handles to notify the user of the low power level when the battery pack system is attached to the handheld game controller and the rechargeable battery pack reaches a low power level; and a reserve power module having first electrical contacts and second electrical contacts, wherein the first electrical contacts of the installed reserve power module are adapted to contact battery contacts in the battery compartment of the game controller for providing electrical power from the reserve power module to the game controller when the retention cage is removably attached to the game controller, wherein the second electrical contacts of the installed reserve power module are adapted to contact the electrical contacts of the rechargeable battery pack when the rechargeable battery pack is removably installed in the retention cage, wherein the reserve power module is adapted to receive electrical power from the rechargeable battery pack for powering the game controller and for charging the reserve power module.

8. The battery pack system of claim 7 wherein the rechargeable battery pack includes one or more display elements for indicating a status of the rechargeable battery pack and a button for temporarily activating the display elements.

9. The battery pack system of claim 7 wherein the reserve power module stores the electrical power using one or more capacitors or super capacitors.

10. The battery pack system of claim 7 further comprising a second rechargeable battery pack.

11. The battery pack system of claim 10 further comprising a battery charger for simultaneously charging two or more instances of the rechargeable battery pack.

12. A battery pack kit for use with a battery powered handheld game controller, the battery pack kit comprising:
   a retention frame configured to be removably attachable to the handheld game controller;
   a reserve power module having electrical contacts configured to contact battery contacts of the handheld game controller for providing electrical power from the reserve power module to the handheld game controller when the reserve power module is removably installed in the retention frame and the retention frame is attached to the handheld game controller; and
   a rechargeable battery pack having a first set of electrical contacts and a second set of electrical contacts, wherein the rechargeable battery pack is configured to provide power to one or more of the reserve power module and the handheld game controller through the first set of electrical contacts when the rechargeable battery pack is removably installed in the retention frame and the retention frame is attached to the handheld game controller, wherein the rechargeable battery pack may be charged or discharged through both of the first and the second sets of electrical contacts;
   wherein the reserve power module is configured to temporarily power the handheld game controller during a period when the rechargeable battery pack is removed from the retention frame.

13. The battery pack kit of claim 12 further comprising a second rechargeable battery pack and a charger configured for charging the first and second rechargeable battery packs.

14. The battery pack kit of claim 12 further comprising a second retention frame having dimensions which are different than dimensions of the retention frame, the second retention frame configured to be compatible with a second handheld game controller that is different from the handheld game controller, wherein the reserve power module and the rechargeable battery pack are each compatible with both the first retention frame and the second retention frame.

15. The battery pack kit of claim 12 wherein the installed rechargeable battery pack is configured to provide the electrical power to the handheld game controller indirectly through the installed reserve power module.

16. The battery pack kit of claim 12 wherein the reserve power module stores the electrical power using one or more capacitors or super capacitors.

* * * * *